(12) United States Patent
Venturato et al.

(10) Patent No.: US 6,669,010 B1
(45) Date of Patent: Dec. 30, 2003

(54) APPARATUS FOR TRANSFERRING CONTAINERS OF THERMOPLASTIC MATERIAL WITH A PREFIXABLE ORIENTATION

(75) Inventors: Tullio Venturato, Treviso (IT); Nicola Da Riol, Pordenone (IT)

(73) Assignee: SIPA S.p.A., Treviso (IT)

( * ) Notice: Subject to any disclaimer, the term of this patent is extended or adjusted under 35 U.S.C. 154(b) by 0 days.

(21) Appl. No.: 09/914,988

(22) PCT Filed: Feb. 7, 2000

(86) PCT No.: PCT/EP00/00942

§ 371 (c)(1),
(2), (4) Date: Apr. 30, 2002

(87) PCT Pub. No.: WO00/53516

PCT Pub. Date: Sep. 14, 2000

(30) Foreign Application Priority Data

Mar. 5, 1999 (IT) ......................................... PN99A0027

(51) Int. Cl.$^7$ ............................................. B65G 29/00
(52) U.S. Cl. .............................. 198/867.09; 198/803.12
(58) Field of Search ........................... 198/377.09, 381, 198/867.09, 803.12; 118/502, DIG. 10; 425/397, 403.1, 428, DIG. 33

(56) References Cited

U.S. PATENT DOCUMENTS

| | | | |
|---|---|---|---|
| 4,104,845 A | * | 8/1978 | Hoffmann ........................ 53/14 |
| 4,185,812 A | * | 1/1980 | Hall ............................ 198/345 |
| 4,312,437 A | | 1/1982 | Suzuki |
| 4,684,012 A | * | 8/1987 | Feddersen ................. 198/803.1 |
| 4,763,778 A | * | 8/1988 | Feddersen et al. ........ 198/803.1 |
| 4,778,045 A | * | 10/1988 | Grune et al. ........... 198/803.14 |
| 4,790,741 A | * | 12/1988 | Takakusaki et al. ......... 425/526 |
| 5,282,526 A | | 2/1994 | Gibbemeyer |
| 5,388,707 A | * | 2/1995 | Stivison et al. .............. 209/602 |
| 5,484,052 A | * | 1/1996 | Pawloski et al. ....... 198/803.11 |
| 5,660,902 A | | 8/1997 | Unterlander et al. |
| 5,769,476 A | * | 6/1998 | Lawn et al. .............. 198/803.8 |
| 5,810,955 A | * | 9/1998 | Seifert et al. ................ 198/381 |
| 5,853,775 A | | 12/1998 | Oas |
| 5,913,402 A | * | 6/1999 | Miura et al. .............. 198/690.1 |
| 6,279,505 B1 | * | 8/2001 | Plester et al. ............... 118/718 |

* cited by examiner

Primary Examiner—Douglas Hess
(74) Attorney, Agent, or Firm—Pearne & Gordon LLP

(57) ABSTRACT

Pick-up plug comprising at least an annular stator (10) engaging driving means, a motor (11) in an equally annular shape capable of being associated to said stator (10) and having the same axis (O) thereof, said rotor and said respective stator (10) being mutually engaged by means of generally known means and being adapted to rotate relatively to each other about said common axis (O). In the stator there are applied a plurality of magnets adapted to be collected into a multiplicity of distinct clusters, in which each cluster of magnets comprises magnets provided with a same polarity ((N), (8)), and in the rotor there are applied a plurality of magnets capable of being collected into clusters in a similar manner. Said magnets of the rotor and said magnets of the stator are arranged so as to enable said rotor and said stator to dispose themselves, when at rest, into a defined number of prefixable positions.

7 Claims, 7 Drawing Sheets

APPARATUS FOR TRANSFERRING CONTAINERS OF THERMOPLASTIC MATERIAL WITH A PREFIXABLE ORIENTATION

This application claims the benefit of International Application Number PCT/EP00/00942, which was published in English on Sep. 14, 2000.

DESCRIPTION

The present invention refers to an improved apparatus for maintaining a prefixed orientation when conveying on a large-scale basis orderly sequences of containers made of thermoplastic material, in particular polyethylene terephtalate (PET) and polypropylene (PP), in particular appropriate semi-finished items generally known as "preforms" in the art, which are usually blow-moulded subsequently for conversion into finished containers.

In particular, the present invention can be used in a most advantageous manner when the described apparatus, which in the following description will be referred to as a "pick-up plug" after the name under which it is widely known by those skilled in the art, is associated to a preform production plant that is also known in the art as a single-stage plant, but can of course be advantageously used also in connection with plants that are solely fed with previously produced preforms to only carry out the final blow-moulding phase (two-stage plants).

As a matter of fact, these processes for the production of such types of containers are generally known to be able to be schematically divided into two basic typologies, ie. single-stage and two-stage processes.

In two-stage processes, a previously moulded preform or parison in a substantially amorphous state is heated up again to its preferred molecular orientation temperature, at which it is then blow-moulded to the desired shape. As used this particular context, the term "two-stage process", or simply "two-stage", is intended to mean any process that produces a preform or parison which must subsequently be heated up again from ambient temperature to the respective blow-moulding temperature.

On the contrary, single-stage processes are so defined owing to the fact that they are capable of moulding said so-called preform or parison, transferring the same preform or parison from the injection or extrusion mould (after it has cooled down to some appropriate temperature) to a conditioning station, where said preform or parison is allowed to evenly balance down to a preferred molecular orientation temperature. Said preform or parison is then transferred to a blow-moulding tool, where it is moulded into the desired shape.

The state of the art concerning the techniques used to solve the problems connected with the injection moulding and extrusion of said preforms, the final blow-moulding thereof, as well as the synchronization of the related processes in view of increasing the efficiency and productivity of the plant, is exhaustively described in the European patent application EP 0 768 165, filed by this same Applicant, which also describes the most significant patents covering this matter, and to which reference should therefore be made.

Both above cited types of production methods involve the use of a (per sé known) blow-moulding station and the therewith associated handling means for transferring and releasing the preforms and/or the blow-moulded containers after the blow-moulding phase.

Largely known in the art are also the problems connected with the transfer, or conveyance, of the preforms. The system used to transport these preforms from the injection-moulding station through to the final container ejection station, via the conditioning and blow-moulding stages, is namely based, in the current single-stage blow-moulding plants by SIPA, on the use of said pick-up plugs.

These pick-up plugs are capable of supporting and carrying the preforms, allowing them to be rotated in those cases in which a conditioning process by hot air is used.

In this case, in fact, the pick-up plug is constituted by a "stator", which is appropriately coupled to the driving belt, and a rotor (or collar body), which is free to rotate about its axis and which is driven rotatably in the conditioning station for as long a time as necessary for the hot air to be able to heat up the preform supported by it.

This capability of rotating freely does not however enable the preform or the container to be known to be in a given, pre-established position at any given time, and sometimes this may be a problem, actually.

In particular, this occurs when
1) a well-defined orientation of the thread (which is obtained by injection moulding) with respect to some match or reference on the container (which is obtained by blow moulding) is required;
2) diametrically asymmetrical preforms are used, which are required to enter the blow-moulding tool with a well-defined orientation, wherein this orientation is usually lost during the conditioning phase;
3) diametrically asymmetrical (ovally shaped bottles for detergents), squared containers are produced or in the case in which a particular orientation is required downstream of the blow-moulding tool owing to the need for a matching interface to be created between the latter and the container ejection and unloading system, which is provided with appropriate collection cups that are given a similar shape as the containers they are intended to accommodate.

The fact should also be mentioned at this point that the container undergoes a rotation when the blow-moulding tool is opened, owing to the friction occurring between the die and the same container.

The above cited problems, along with further ones arising when a given orientation of the preform or container is required, can be solved by the use of a pick-up plug whose orientation is capable of being pre-established and ensured each time that it is left in a resting position.

U.S. Pat. No. 5,282,526 discloses a device for holding container preforms on carriers for further processing. A preform is put onto the rotatable part of a carrier at an indefinite angular position thereof. Subsequent reorientation is therefore necessary.

Based on the above considerations, it is therefore a main purpose of the present invention to provide a pick-up plug that makes use of permanent magnets which are appropriately arranged and fixed on the stator and rotor thereof so as to allow for, when at rest, a multiplicity of different orientations, such as the one required in the conditioning station.

It is a further purpose of the present invention to provide a pick-up plug of the above cited kind, which is additionally capable of feeding in a substantially continuous and automatic manner the connected processing plants, without any interposition of non-automatic phases or phases that may break the continuity of the feeding flow of preforms or blow-moulded containers; moreover, such a pick-up plug must be easily implemented with the use of readily available techniques and means and shall therefore be reasonably low in its overall costs.

Such main aims of the present invention, along with further features thereof, are reached in an apparatus that is made and operates as recited in the appended claims.

The present invention may take the form of a preferred embodiment such as the one that is described in detail below by way of non-limiting example with reference to the accompanying drawings, in which.

The basic peculiarity of the present invention resides in providing pick-up plugs adapted to pick-up and transport individual preforms, and the related finished containers, which comprise, in their stator, a plurality of magnetized elements that are capable of being collected into a multiplicity of distinct clusters of magnets, in which each such cluster of magnets comprises magnets provided with a same polarity, and comprise, in their rotor, a plurality of magnetized elements that are capable of being collected into a multiplicity of distinct clusters of magnets, in which each such cluster of magnets comprises magnets provided with a same polarity, said magnets of both the rotor and the stator being arranged so as to enable said rotor and said stator to dispose themselves, when at rest, into a definite number of prefixable relative positions with respect to each other.

Figure 6A:
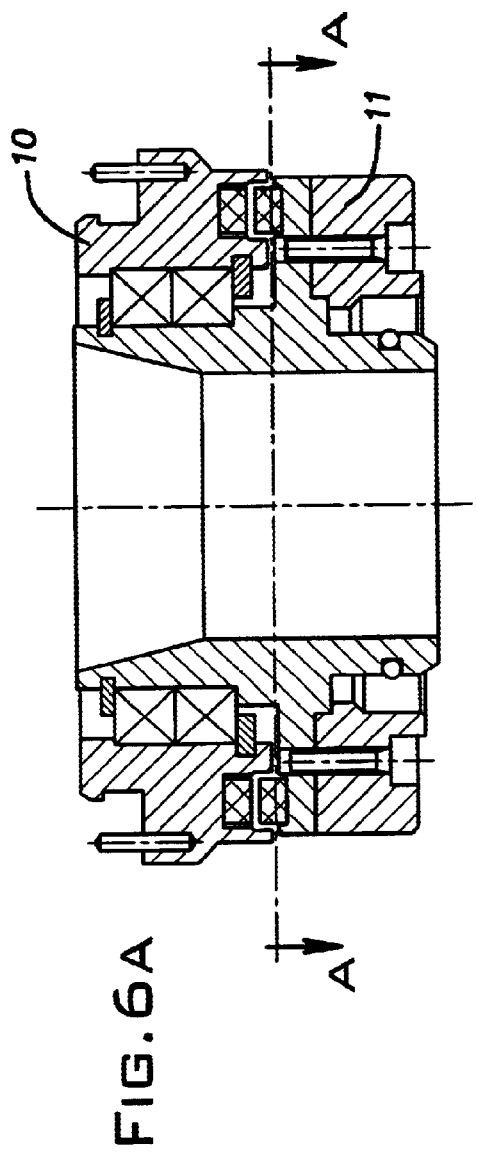
FIGS. 6, 6a and 6b are views of the vertical median section and the same section with the horizontal section planes A—A and B—B, respectively, of a pick-up plug according to the present invention.
Figure 1:
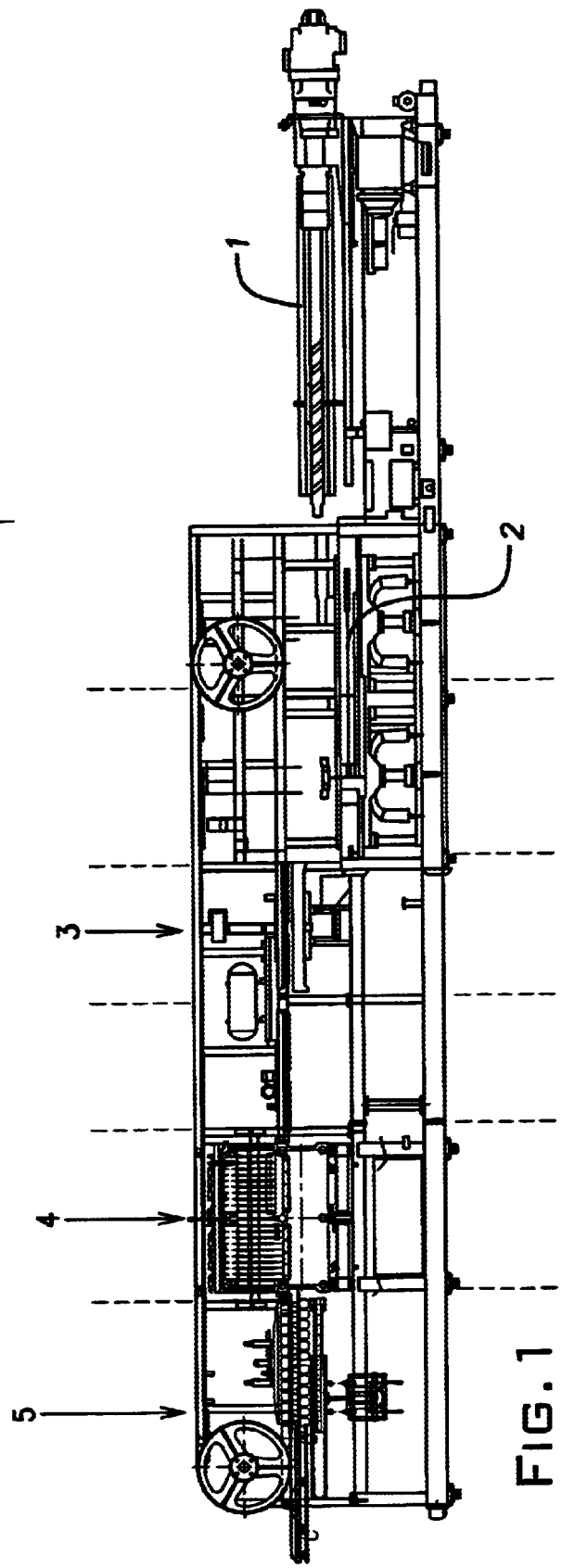
FIG. 1 is an overall side view of a single-stage plant adapted to make use of the present invention.
Figure 2:
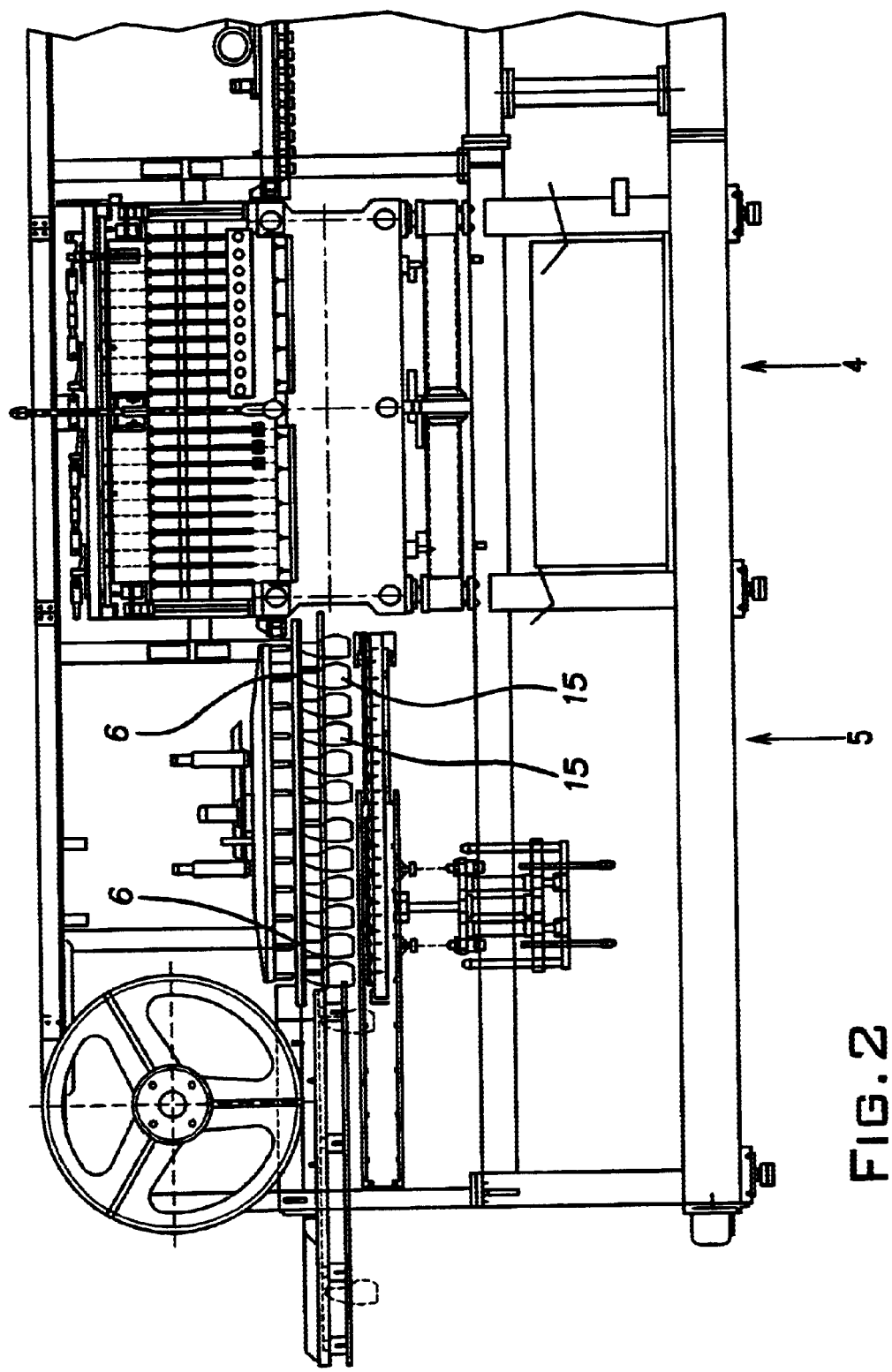
FIG. 2 is an enlarged view of the left-hand portion of the plant illustrated in FIG. 1.

FIG. 1 illustrates a single-stage plant comprising an extrusion unit 1, a plurality of preform injection-moulding moulds 2, a conditioning station 3, a blow-moulding station 4 in which the finished product 15 is formed, an ejection or unloading station 5, in which the finished containers are finally separated from the respective pick-up plugs and are conveyed towards the subsequent processing stations. In FIG. 2, the position of the pick-up plugs is generally indicated at 6.

Figure 3:
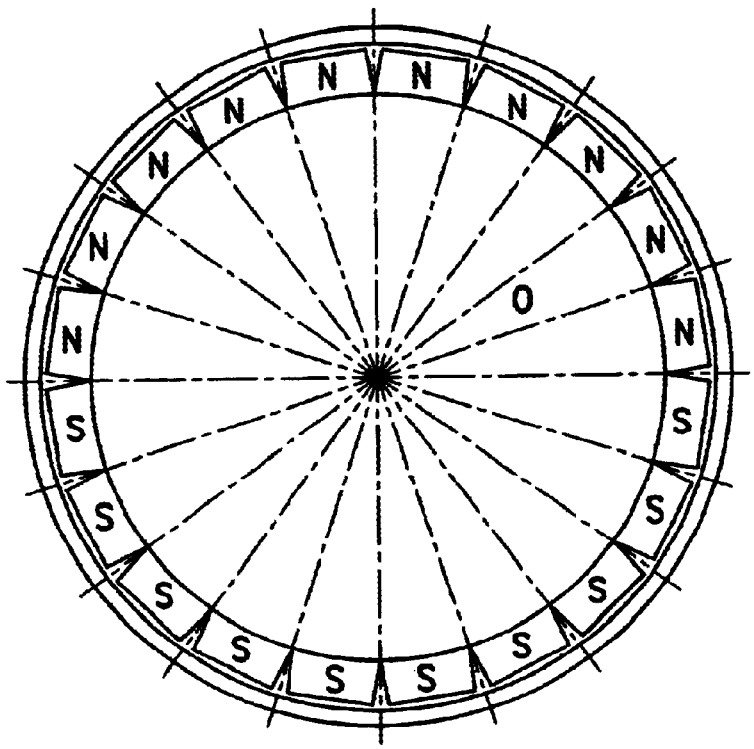
FIGS. 3, 4 and 5 are views of three respective possible arrangements of the magnets in the rotor and the respective stator of corresponding pick-up plugs according to the present invention.

Referring now to FIG. 3, it should be noticed that there are arranged, distributed in a ring-like configuration, a plurality of magnets around a central axis O.

These magnets are subdivided into two distinct clusters, in which a first cluster comprises ten substantially identical and contiguous magnets, generally indicated at N, and a second cluster comprises ten further substantially identical and contiguous magnets having an opposite polarity and, therefore, generally indicated at S.

A total of twenty magnets are therefore comprised in the ring-like configuration in which they are arranged. As a result, given the similar dimension in the radial direction of all said magnets, the cluster of magnets N occupies an arc of exactly 180°. The same applies of course to the cluster of magnets S.

Let us now insert and appropriately lock in position such an assembly of twenty magnets in the stator 10 of a pick-up plug, and let us further arrange and equally lock in position in the rotor 11 of the same pick-up plug twenty magnets having the same dimensions and properties and the same geometrical arrangement as the magnets of the stator, wherein, in order to distinguish the rotor magnets from the stator ones, the same are generally indicated at NR and SR.

Figure 10:
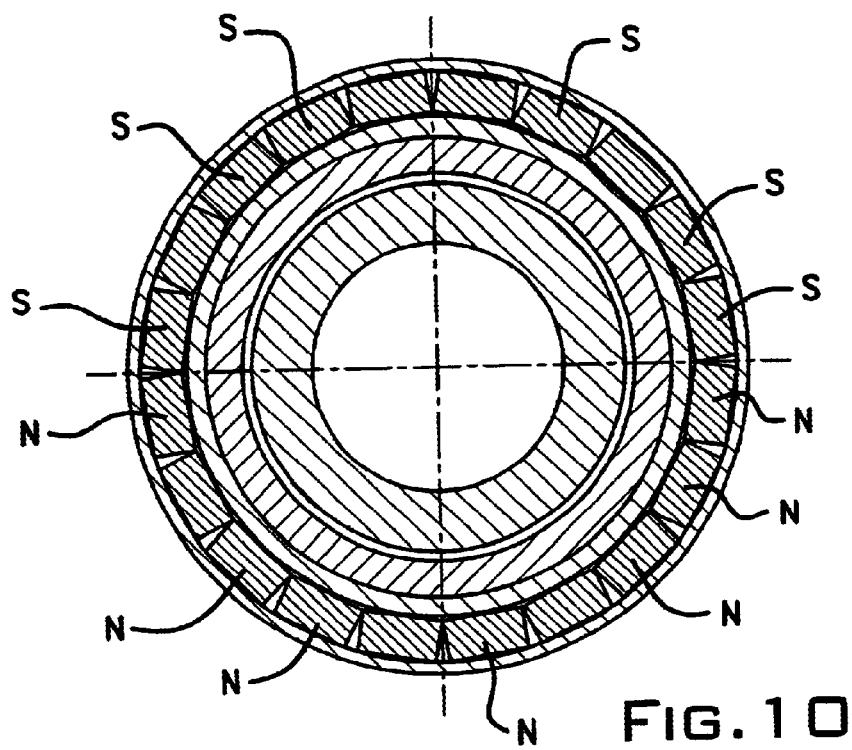
FIGS. 9 and 10 are views of plane cross sections orthogonal to the axis of the pick-up plug appearing in FIG. 6, relating to section A—A and section B—B, respectively.
Figure 9:
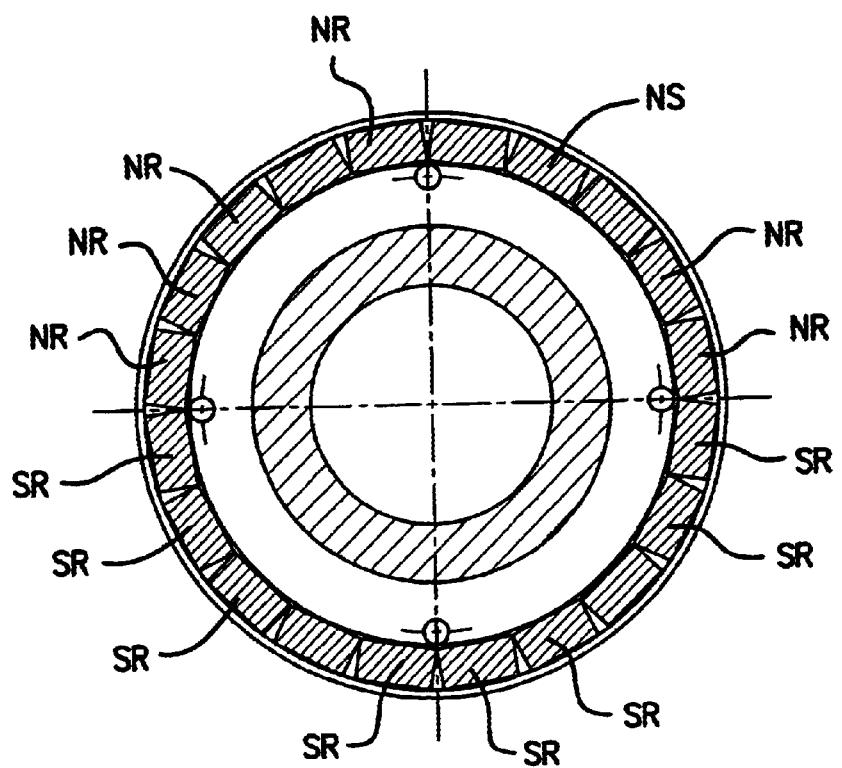

Moreover, let us arrange both the magnets in the rotor and the magnets in the stator substantially on two respective parallel planes, in such a configuration as to enable them to form respective closed-loop rings, so as illustrated in, FIGS. 9 and 10.

Furthermore, let said rings be coaxial and the common axis O thereof coincide with the common axis of the rotor and the stator.

In practice, the pick-up plug is formed by associating the stator 10 with the respective rotor 11 upon having assembled the magnets of FIG. 3 on the rotor, in the face thereof facing the stator, and upon having similarly assembled the magnets on the stator, in the face thereof facing the rotor.

Since the magnets of the rotor are arranged in front of the magnets of the stator, and such a circumstance, owing to the construction of the pick-up plug, persists no matter how said rotor and said stator are rotated relative to each other, it then ensues that, if the magnets are distributed in the rotor and the stator as shown in the Figures, the rotor, when at rest, tends to dispose itself into a single definite position owing to the effect of the magnetic attraction/repulsion action of the individual magnets.

It also quite clearly appears that, if the rotor is displaced into any other position, it will tend to spontaneously move back into exactly said defined position when released.

It can at this point be easily appreciated that, when it is used in practice with either a respective preform or a respective container associated thereto, said preform or container will anyway maintain a pre-defined orientation with respect to the stator; and whenever such an orientation should be modified owing to operating requirements or friction, the same will be automatically restored upon termination of said conditions.

Figure 4:
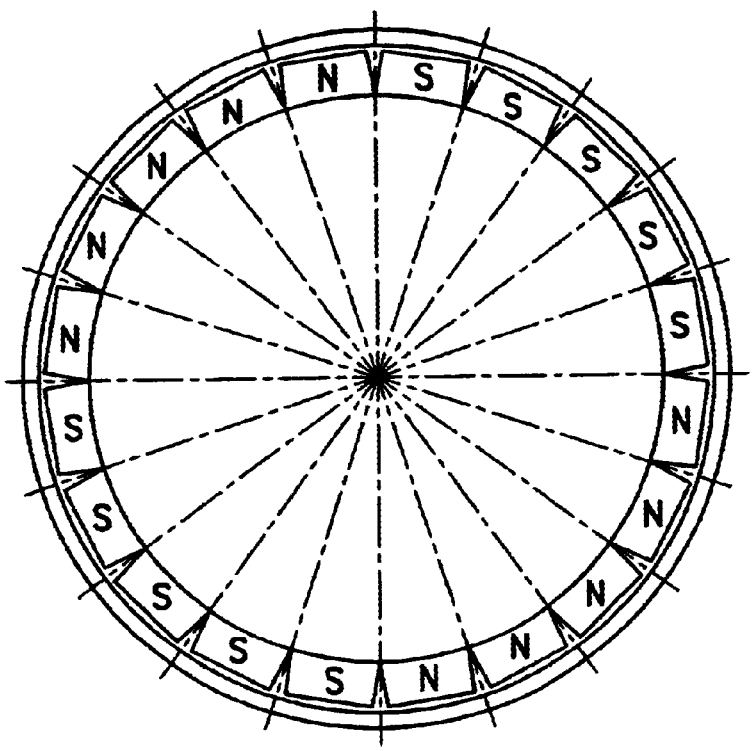
Figure 5:
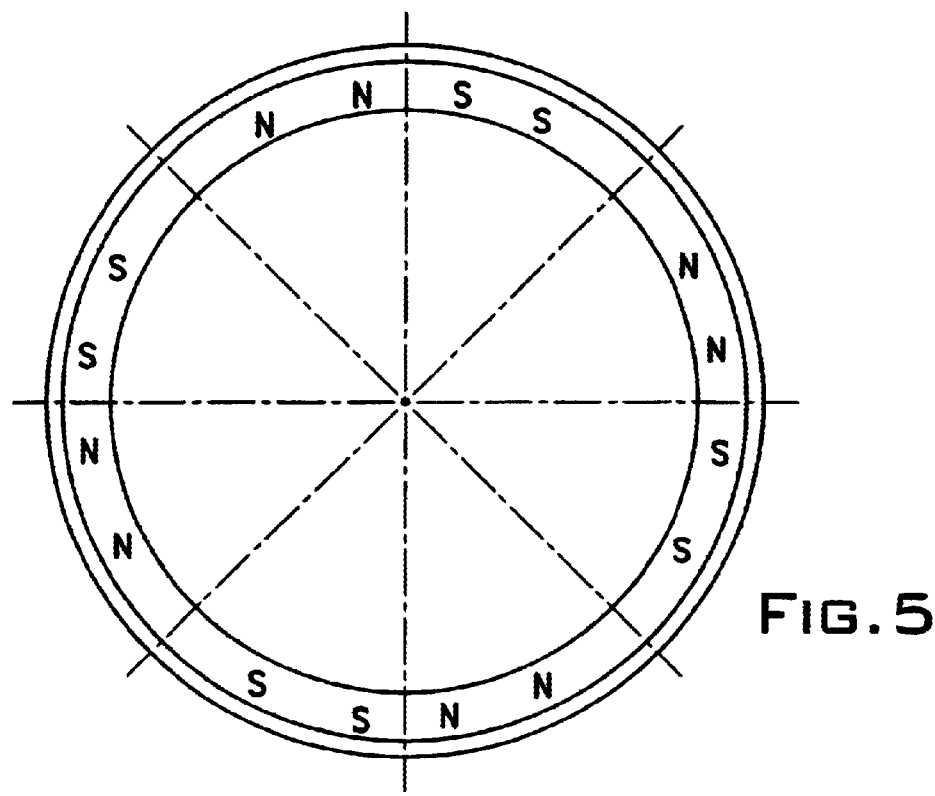

It is therefore fully apparent that, by correspondingly changing the distribution of the magnets in the rotor and the stator, more than a single pre-defined position at rest can be actually obtained. For example, with reference to FIG. 4 which illustrates a different distribution of the magnets in the stator and the rotor, the possibility is given for two distinct relative positions of the rotor and the stator under resting or balance conditions to be pre-determined. Similarly, by mere way of example, FIG. 5 can be noticed to illustrate a rotor featuring four clusters of magnets N and four clusters of magnets S. By associating such a rotor with a corresponding stator, a pick-up plug will be provided which is adapted to offer exactly four such resting or balance points, equally spaced from each other, as anyone skilled in the art is able to easily understand without any further explanation being needed to such a purpose.

An advantageous improvement of the present invention resides in the magnets being arranged so as to prevent, or at least effectively hinder, dirt, dust or any other kind of particles, which are likely to impair the capability of the stator and the rotor to slide relative to each other, from penetrating therethrough.

Figure 6:
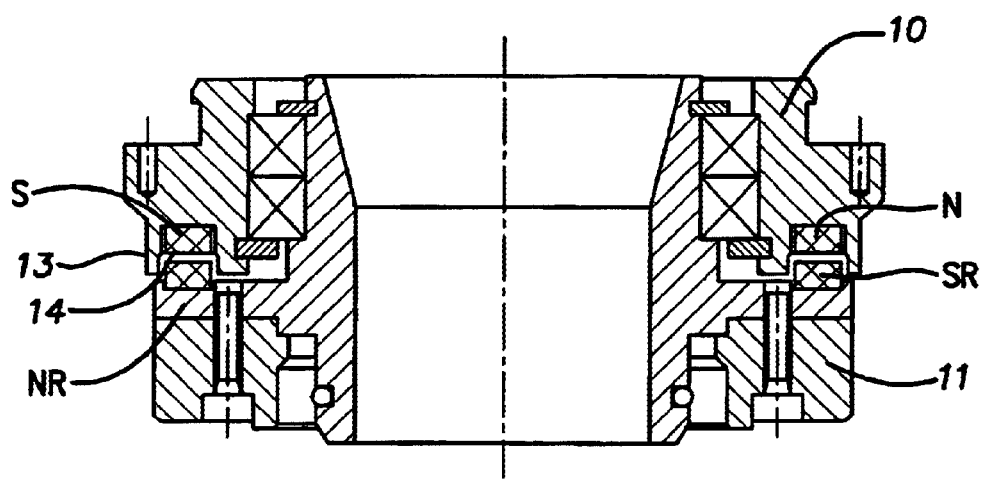
Figure 7:
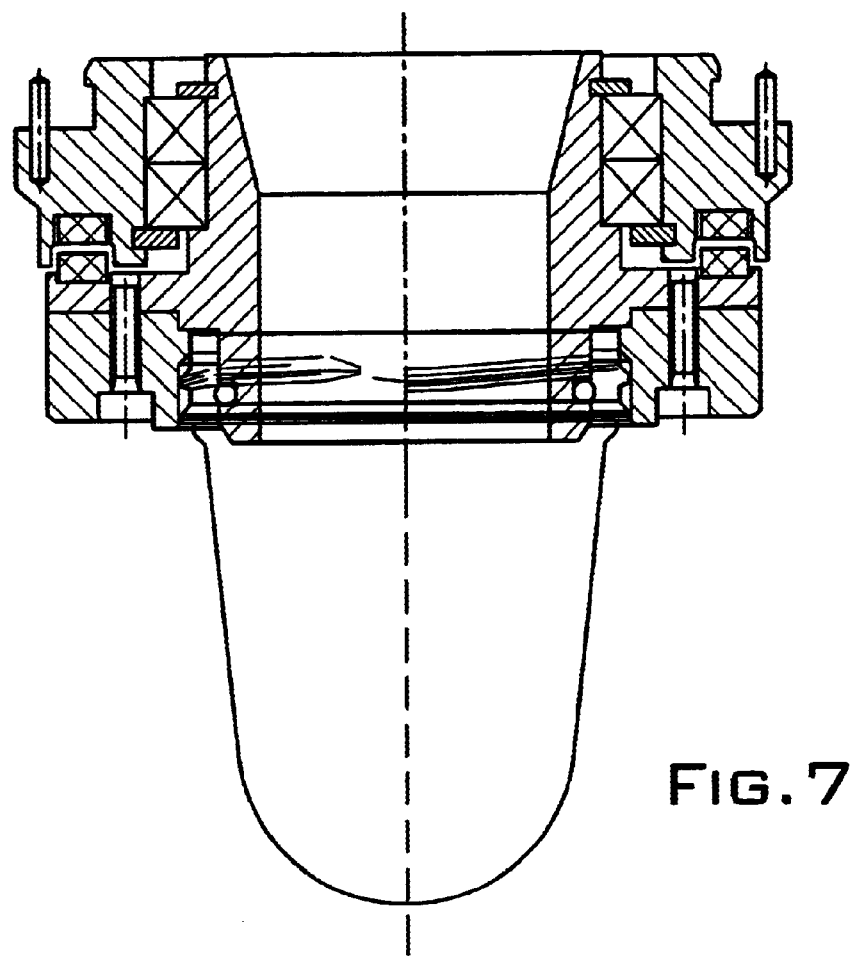
FIG. 7 is a view of the same section shown in FIG. 6, however with a preform associated to the same pick-up plug.
Figure 6B:
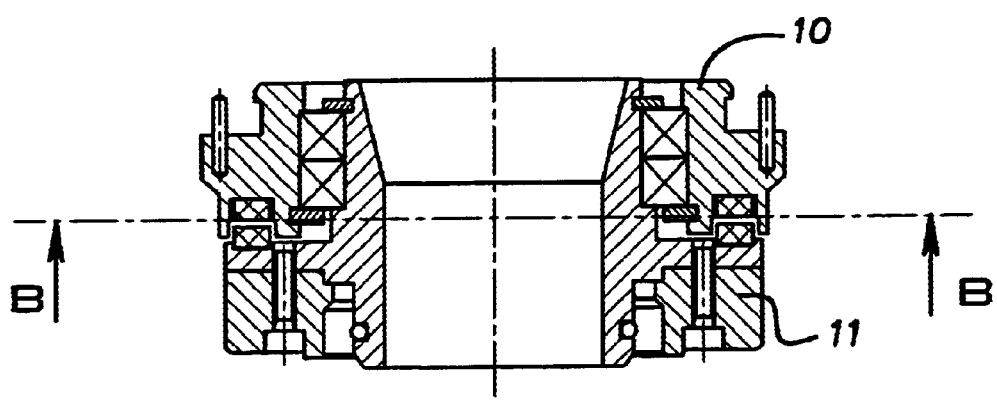
Figure 8:
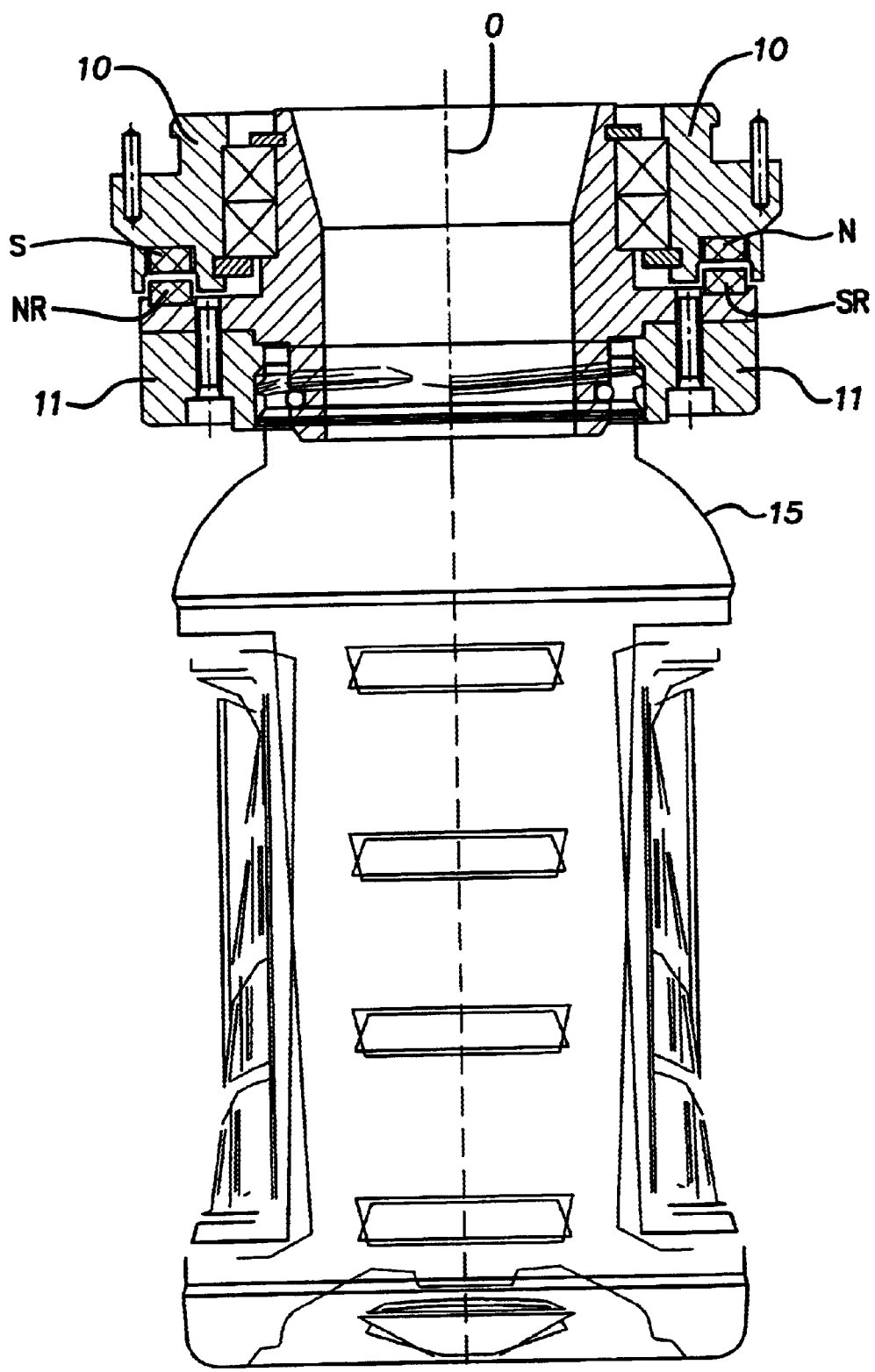
FIG. 8 is a view of the same section illustrated in FIG. 6, however with an asymmetrical bottle associated to the same pick-up plug.

To this purpose, and with reference to FIG. 6, a lip 13 protruding from said stator or said rotor is provided so as to externally cover the gap 14 existing between said magnets N of the stator and said magnets S of the rotor.

What is claimed is:

1. Pick-up plug for carrying hollow bodies of plastic material, which may be constituted by either blow-moulded containers or preforms for blow-moulding into finished containers, and conveying the same towards collecting means or lines in which said containers or preforms are further processed or used, said pick-up plug comprising at least a stator (10) having an annular shape, which is provided with a central axis (O) and is adapted to engage driving means of the belt or magazine or loader type that are capable of transferring said hollow bodies in an orderly and sequential manner into the subsequent processing stations, a rotor (11) having an annular shape, which is capable of being associated to a respective stator and has the same axis, or common axis (O), as the respective stator, said rotor and said respective stator being mutually engaged and being capable of rotating relative to each other about said common axis, characterized in that in said stator there are applied a plurality of magnetized elements capable of being collected into a multiplicity of distinct clusters of magnets, in which each such cluster of magnets comprises magnets provided with a same polarity (N), (S), in said rotor there are applied a plurality of magnetized elements capable of being collected into a multiplicity of distinct clusters of magnets, in which each such cluster of magnets comprises magnets provided with a same polarity (N), (S), said magnets of both the rotor and the stator being arranged so as to enable said rotor and said stator to dispose themselves, when at rest, into a definite number of prefixable relative positions with respect to each other.

2. Apparatus according to claim 1, characterized in that said distinct clusters of magnets in said stator (10) are provided in the same number as the distinct clusters of magnets in said rotor (11).

3. Apparatus according to claim 2, characterized in that
   the magnets associated to the stator are arranged in a substantially ring-like configuration around said common axis, and the magnets belonging to each single one of said clusters are contiguous in said ring, except for the two magnets at the extremities of the respective cluster,
   the magnets associated to the rotor are arranged in a substantially ring-like configuration around said common axis, and the magnets belonging to each single one of said clusters are contiguous in said ring, except for the two magnets at the extremities of the respective cluster.

4. Apparatus according to claim 3, characterized in that the magnets provided on the stator and the magnets provided on the rotor are facing each other so that the rotation of the rotor relatively to the stator causes each magnet of the rotor to be constantly moved in front of one or more magnets of the stator, and similarly causes each magnets of the stator to be constantly displaced in front of one or more magnets of the rotor.

5. Apparatus according to any of the preceding claims, characterized in that each distinct cluster of magnets, either in the rotor or in the stator, contains the same number of individual magnets.

6. Apparatus according to any of the preceding claims, characterized in that said magnets are provided on outer portions of the respective stator and rotor.

7. Apparatus according to any of the preceding claims, characterized in that
   a lip (13) protruding from either said stator or said rotor is provided so as to externally cover the gap (14) existing between the mutually facing surfaces of said magnets (N) of the stator and said magnets (S) of the rotor.

* * * * *